United States Patent
Fester et al.

(10) Patent No.: US 7,900,316 B2
(45) Date of Patent: *Mar. 8, 2011

(54) FILTER FOR A VACUUM CLEANER

(75) Inventors: Joseph A. Fester, Ada, MI (US);
Timothy A. Field, Holland, MI (US)

(73) Assignee: BISSELL Homecare Inc., Grand Rapids, MI (US)

( * ) Notice: Subject to any disclaimer, the term of this patent is extended or adjusted under 35 U.S.C. 154(b) by 519 days.

This patent is subject to a terminal disclaimer.

(21) Appl. No.: 11/668,720

(22) Filed: Jan. 30, 2007

(65) Prior Publication Data

US 2008/0010958 A1  Jan. 17, 2008

(51) Int. Cl.
| | |
|---|---|
| A47L 9/10 | (2006.01) |
| A47L 9/20 | (2006.01) |
| A47L 5/00 | (2006.01) |
| A47L 9/00 | (2006.01) |
| B01D 59/50 | (2006.01) |
| B01D 39/00 | (2006.01) |
| B01D 46/00 | (2006.01) |
| B01D 47/00 | (2006.01) |
| B01D 53/00 | (2006.01) |
| B25G 3/18 | (2006.01) |
| F16B 21/00 | (2006.01) |
| F16D 1/00 | (2006.01) |

(52) U.S. Cl. ............ 15/327.2; 15/347; 55/493; 55/495; 55/504; 55/DIG. 3; 55/385.3; 55/385.4; 403/329

(58) Field of Classification Search ............... 55/472, 55/493, 495, 504, 359, DIG. 3, 385.3, 385.4; 15/347, 327.2; 403/329; 292/322
See application file for complete search history.

(56) References Cited

U.S. PATENT DOCUMENTS

| | | | |
|---|---|---|---|
| 2,730,192 A * | 1/1956 | Meyerhoefer | 55/502 |
| 4,424,883 A | 1/1984 | Musiani | |
| D383,881 S * | 9/1997 | Gudmundsson | D32/30 |
| 6,085,382 A * | 7/2000 | Bobrosky et al. | 15/350 |
| 6,261,331 B1 * | 7/2001 | Fleurier et al. | 55/374 |
| 6,325,844 B1 | 12/2001 | Mead et al. | |
| 6,609,270 B2 | 8/2003 | Kim | |
| 6,807,707 B2 | 10/2004 | Park et al. | |
| D568,014 S * | 4/2008 | Fester et al. | D32/31 |
| 2006/0196157 A1 | 9/2006 | Greer et al. | |
| 2007/0050939 A1 * | 3/2007 | Dant et al. | 15/347 |
| 2007/0209147 A1 * | 9/2007 | Krebs et al. | 15/347 |
| 2009/0000054 A1 * | 1/2009 | Hampton et al. | 15/323 |

OTHER PUBLICATIONS

Prior art submitted by applicant: Photos, Figs. 1-7 of Filter Assembly installed in a vacuum cleaner sold by Bissell Homecare, Inc. in the United States more than 1 year prior to the filing date og the current application.*

Photos, Figs. 1-7, of Filter Assembly installed in a vacuum cleaner sold by Bissell Homecare, Inc. in the United States more than 1 year prior to the filing date of this application.

* cited by examiner

Primary Examiner — Bryan R Muller
(74) Attorney, Agent, or Firm — McGarry Bair PC

(57) ABSTRACT

A filter assembly for a vacuum cleaner comprises a filter carrier and a filter element. The filter carrier has a curved rear surface and a pair of protrusion for mounting the filter carrier to the vacuum cleaner.

17 Claims, 14 Drawing Sheets

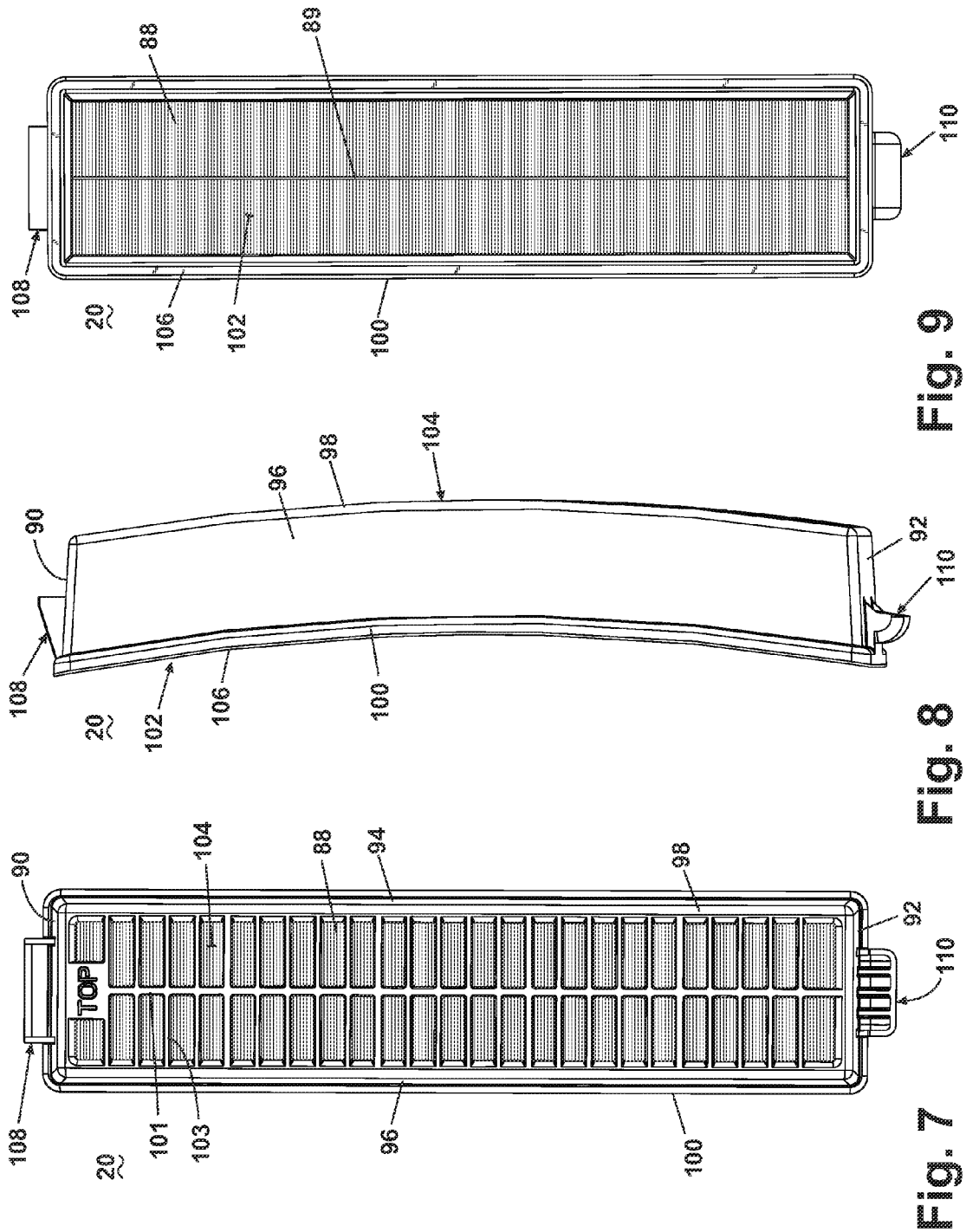

FILTER FOR A VACUUM CLEANER

BACKGROUND OF THE INVENTION

1. Field of the Invention

This invention relates to vacuum cleaner filtration. In one of its aspects, the invention relates to a filtration assembly for a vacuum cleaner. In another of its aspects, the invention relates to a fine particle filter for filtering particles downstream from a primary particle separator. In yet another of its aspects, the invention relates to a filtration assembly for a vacuum cleaner.

2. Description of the Related Art

Upright vacuum cleaners have a main filtration or separation assembly for separating dirt and debris from air drawn into the vacuum cleaner by suction force. The main filtration assembly typically comprises a conventional filter bag or a centrifugal separator. Vacuum cleaners with a centrifugal separator may employ a cyclone separator as a main filtration or separation assembly, such as a frusto-conical shaped separator, while others use high-speed rotational motion of the air/dirt in a cylindrical separator to separate the dirt by centrifugal force. Typically, working air enters and exits at an upper portion of the cyclone separator and the bottom portion of the cyclone separator is used to collect debris. It is further known to employ multiple serial cyclone separators to improve the collection of fine debris particles that may not be collected by a single separator.

Vacuum cleaners further have at least one motor/fan assembly for generating suction to draw air and debris into the vacuum cleaner. In some models, a second motor/fan assembly is used to drive an agitator, such as a brushroll. Air to cool to the motor/fan assemblies is drawn into the vacuum cleaner and subsequently exhausted from the housing through separate ports in vacuum cleaner housing. As the air passes through the motor, carbon dust discharged from the motor brushes can become entrained in the air and thus also exhausted from the vacuum cleaner, leading to contamination of the home environment. Some effort has been made to filter the motor cooling air after it has passed through the vacuum cleaner. A second or auxiliary filtration assembly comprising a "mechanical" filter can be employed for this purpose. A filter can be placed at the inlet or exhaust port to remove carbon dust from the motor cooling air, however, this filter adds expense and bulk to the vacuum cleaner. A high efficiency particle arrestor (HEPA) filter is commonly used for the second filtration assembly.

Even those vacuum cleaners having means to collect fine debris and to filter the motor cooling air after it passes through the motor do not protect the home environment from certain bacteria and molds that may be drawn from a carpet or other surface and rendered airborne by the exhaust form the vacuum cleaner, spreading unpleasant odors and unhealthy bacteria. The vacuum cleaner can suction up bacteria and mold, but then these undesirable items are exhausted back into the home environment because their small size prohibits collection by a cyclone separator.

SUMMARY OF THE INVENTION

According to the invention, a filter assembly for a vacuum cleaner comprises a filter carrier having a rectilinear shape includes a pair of opposed side walls, each having a arced rear edge, a pair of opposed end walls that are shorter in width than the side walls, each end wall having a rear edge and a protrusion extending away from at least one end wall, the rear edges of the side and end walls defining a concave air inlet opening; and a front surface having an air outlet. A filter element is adapted to be mounted within the filter carrier.

In one embodiment, a resilient gasket is adapted to be mounted on the rear edges of the side and end walls to form a seal between the filter carrier and a filter receiver.

In another embodiment, the protrusions can have a planar surface oriented generally perpendicular to the end wall and generally parallel to and spaced from the rear edge. One of the protrusions forms a ramp that extends from a top surface of the planar surface towards the rear edge, increasing in height in a direction away from the air inlet. In one embodiment, the other protrusion forms an arc from the top of the second planar surface towards the rear edge. The protrusion that forms the ramp is adapted to seat behind a resilient tab. The protrusion that forms the arc is adapted to seat in a slot.

The resilient gasket is typically affixed to the rear edges of the side and end walls to form a seal between the filter carrier and the filter receiver. Further, both the side walls and end walls are impermeable.

The filter element can take number of forms. However, a pleated filter, preferably a pleated HEPA filter is preferred. Further, the filter element has a reinforcing rib along the length thereof and between the sides thereof. In a preferred embodiment of the invention, the filter element is sealed within the filter carrier. Further, the radius of curvature of the arced rear edges of the side walls is in the range of about 700 mm to about 870 mm, and is preferably about 786 mm.

BRIEF DESCRIPTION OF THE DRAWINGS

In the drawings:

FIG. 6B is a bottom perspective view of the resilient tab from FIG. 5a.

FIG. 7 is a front view of the filter carrier from FIG. 2.

FIG. 8 is a side view of the filter carrier from FIG. 2.

FIG. 9 is a rear view of the filter carrier from FIG. 2.

DESCRIPTION OF THE PREFERRED EMBODIMENT

Figure 1:
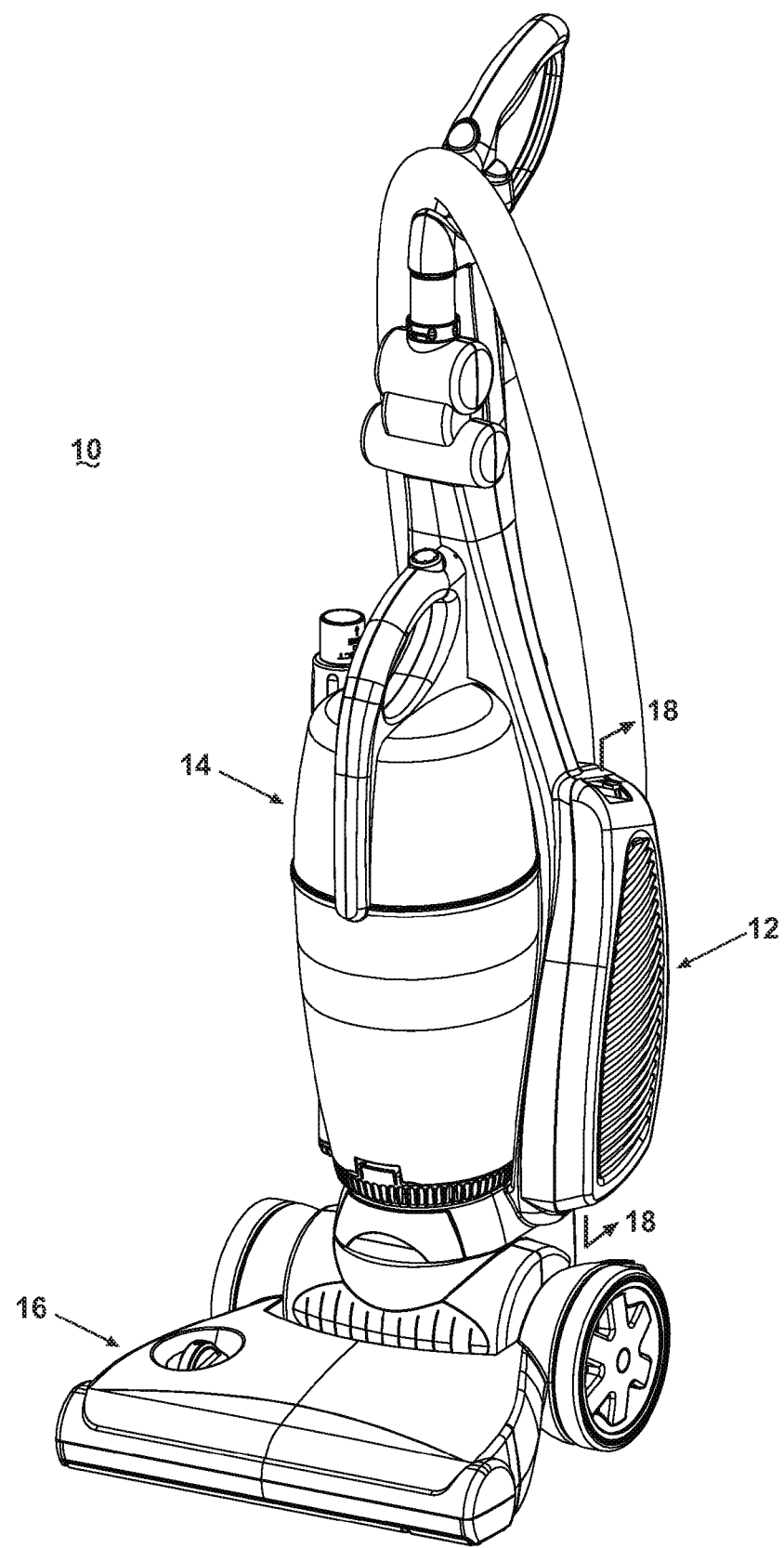
FIG. 1 is a perspective view of a vacuum cleaner comprising a filter assembly according to the present invention.

Referring to the drawings, and in particular to FIG. 1, an upright vacuum cleaner 10 comprises a filter assembly 12 according to the present invention. The vacuum cleaner further comprises an upright assembly 14 pivotally mounted to a base assembly 16. The filter assembly 12 is generally located on the upright assembly 14. Other components that are common to a vacuum cleaner, such as a suction nozzle, agitator or brushroll, dust collector, motor/fan assembly, etc., are not germane to the invention and are not described in detail herein. A more detailed description of these and other common components can be found in International Patent Application PCT PCT/US2006/026695 published Jan. 12, 2007 and entitled "Vacuum Cleaner Upright Assembly" which is incorporated herein by reference in its entirety.

Figure 2:
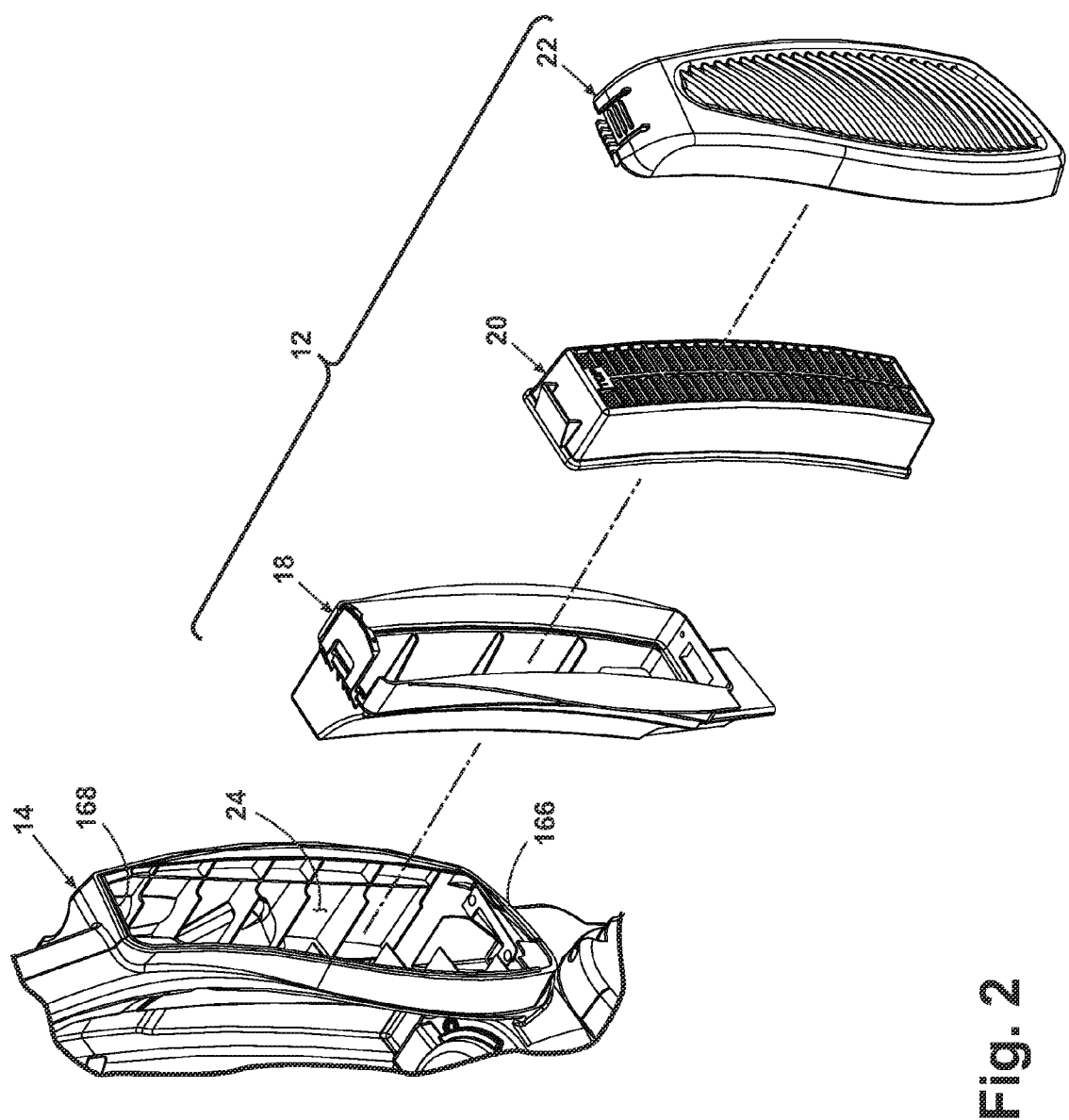
FIG. 2 is an exploded view of the filter assembly comprising a filter receiver, a filter carrier, and a filter cover.

Referring to FIG. 2, the filter assembly 12 comprises a filter receiver 18, a removable and replaceable filter carrier 20 and a removable filter cover 22. The filter receiver 18 is preferably affixed to the vacuum cleaner 10 or integral therewith, or can alternately be removable from the vacuum cleaner 10. In the illustrated embodiment, the filter receiver 18 is affixed within a recess 24 formed on one side of the upright assembly 14 of the vacuum cleaner 10. The filter receiver 18 receives and supports the filter carrier 20, while the filter carrier 20 receives and supports the filter cover 22; however, the filter receiver 18 could alternately receive and support both the filter carrier 20 and the filter cover 22.

Figure 3:
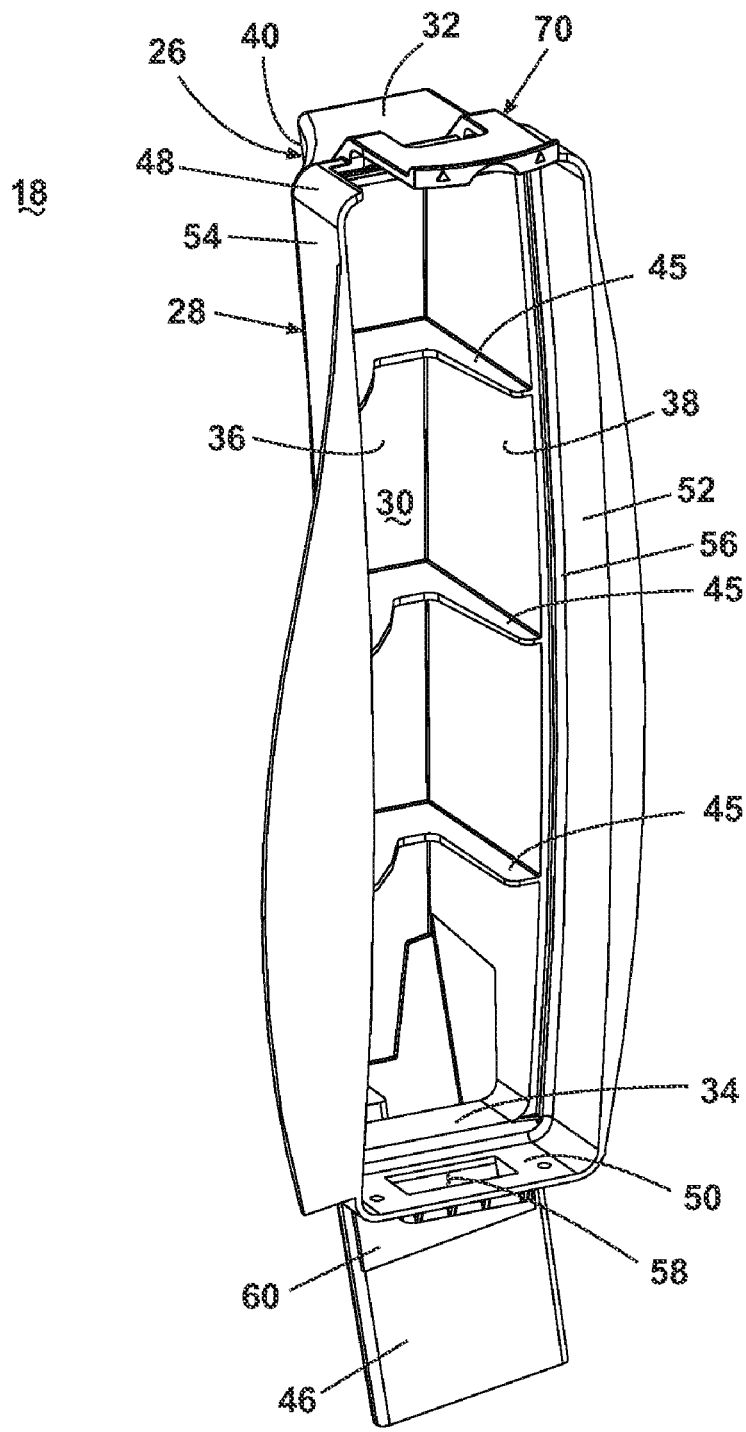
FIG. 3 is a right perspective view of the filter receiver from FIG. 2.
Figure 4:
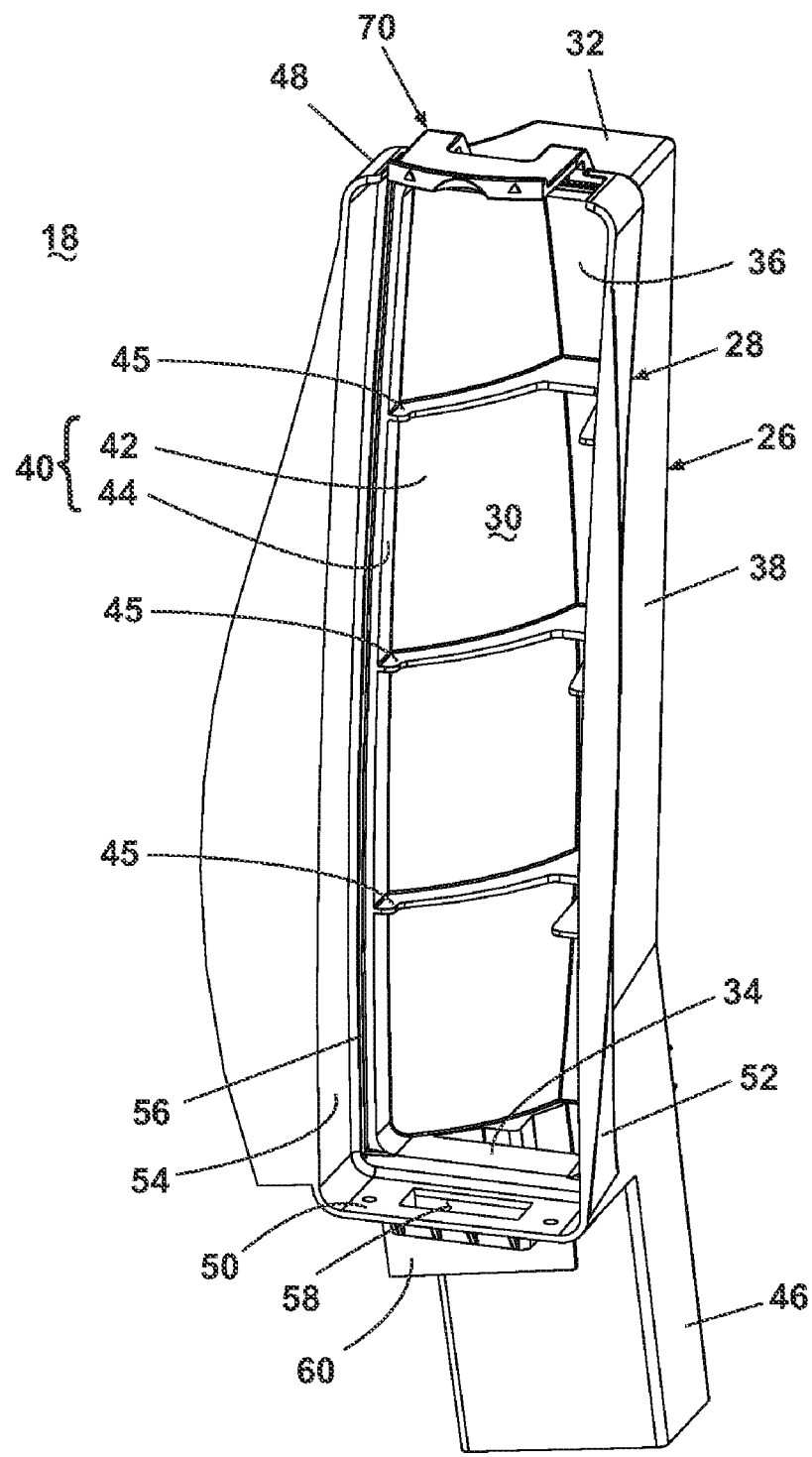
FIG. 4 is a left perspective view of the filter receiver from FIG. 2.

Referring to FIGS. 3-4, the filter receiver 18 comprises first and second housing portions 26, 28, respectively that are integrally formed with one another, the first housing portion 26 defining an elongated airflow chamber 30 and the second housing portion 28 serving as a support for the filter carrier 20. The first housing portion 26 is formed by a top wall 32, bottom wall 34, rear wall 36, right side wall 38, and left side wall 40. The top, bottom, rear, and right side walls 32-38 are generally planar. The left side wall 40 comprises a first curved surface 42 and a second planar surface 44. The first curved surface 42 extends from the rear wall 36 to the second planar surface 44 and from the top wall 32 to the bottom wall 34 and is oriented so that the width of the airflow chamber 30, defined as the distance between the right side wall 38 and the left side wall 40, increases in a direction away from the rear wall 36. The second planar surface 44 extends from the first curved surface 42 to the second housing portion 28 and from the top wall 32 to the bottom wall 34. Generally horizontal ribs 45 can be formed on the right and left side walls 38, 40.

The airflow chamber 30 extends through the bottom wall 34 and opens into a conduit 46 for fluid communication with a motor/fan assembly (not shown) that generates suction to draw air and debris into the vacuum cleaner 10. The conduit 46 extends away from the bottom wall 34, and at least a portion of the conduit 46 can be integrally formed with the filter receiver 18.

The second housing portion 28 comprises spaced top and bottom walls 48, 50 joined by spaced right and left side walls 52, 54. A stepped wall 56 joins the second housing portion 28 to the first housing portion 26 so that the width and height of the second housing portion 28 is slightly larger than that of the first housing portion 26.

Figure 5:
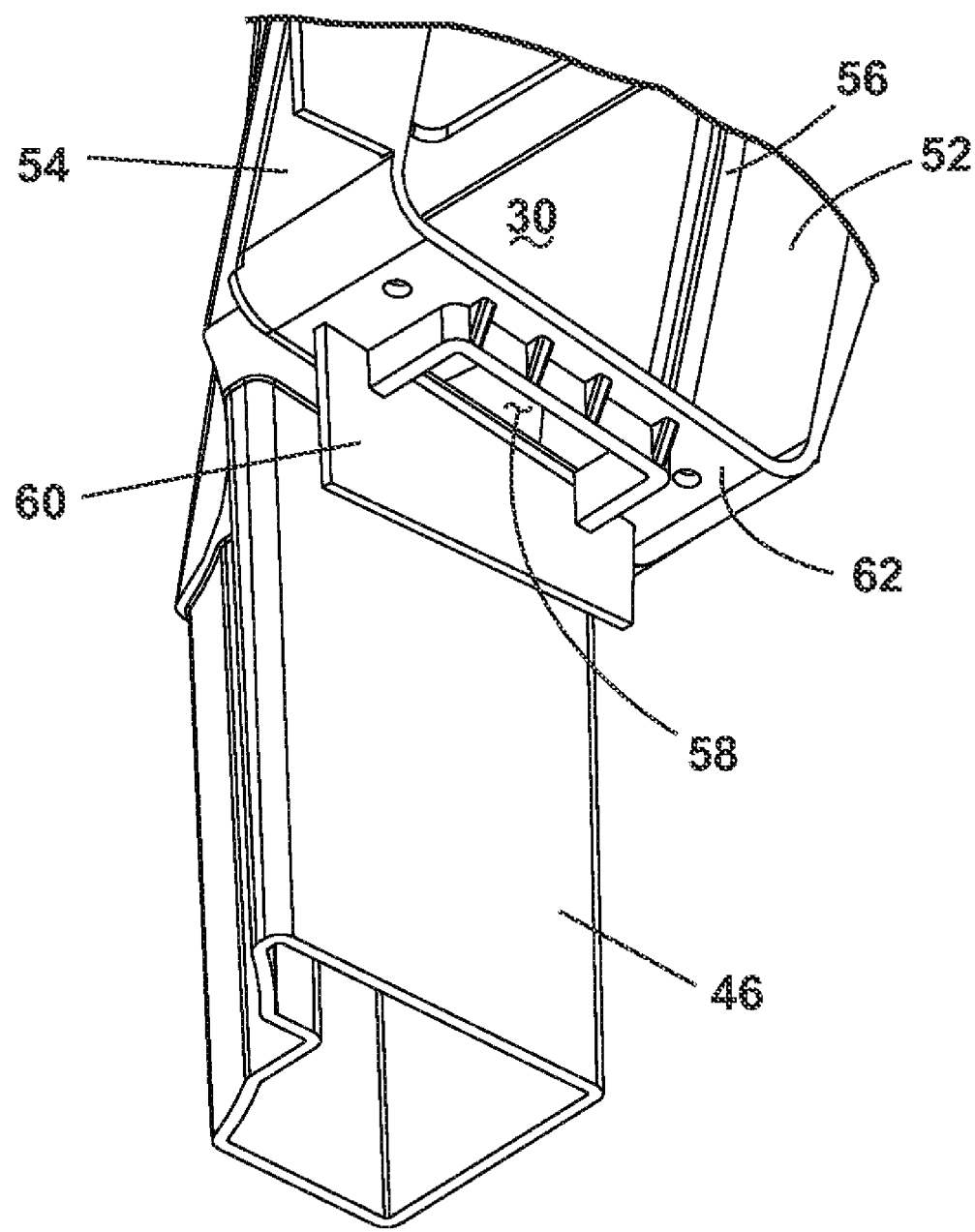
FIG. 5 is a partial bottom perspective view of the filter receiver from FIG. 3

Referring to FIG. 5, the bottom wall 50 has a slot 58 formed therethrough that is generally rectangular in shape. A flange 60 extends normally from a bottom surface 62 of the bottom wall 50 in spaced relation to the conduit 46 and abuts the slot 58 on one side.

Figure 6A:
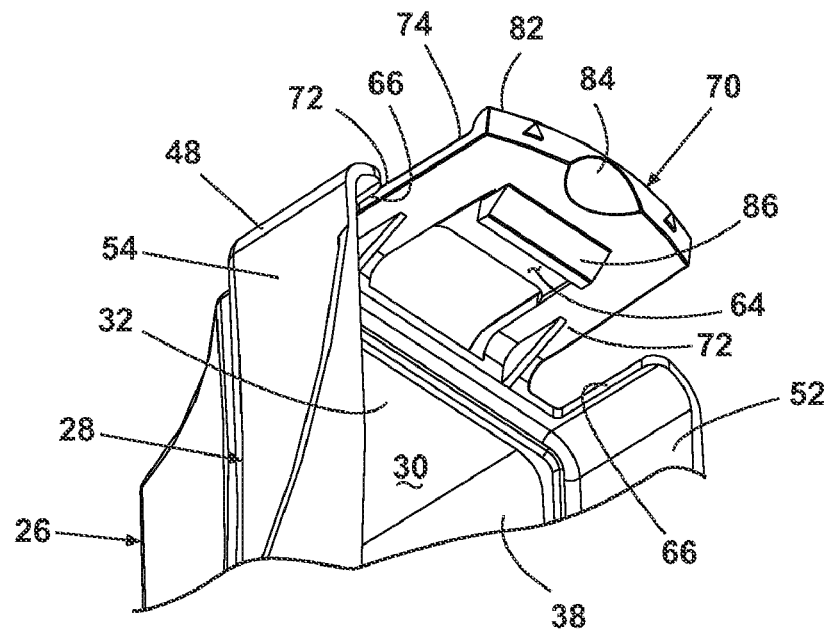
FIG. 6A is a partial top perspective view of the filter receiver from FIG. 3, illustrating a resilient tab on the filter receiver.
Figure 6B:
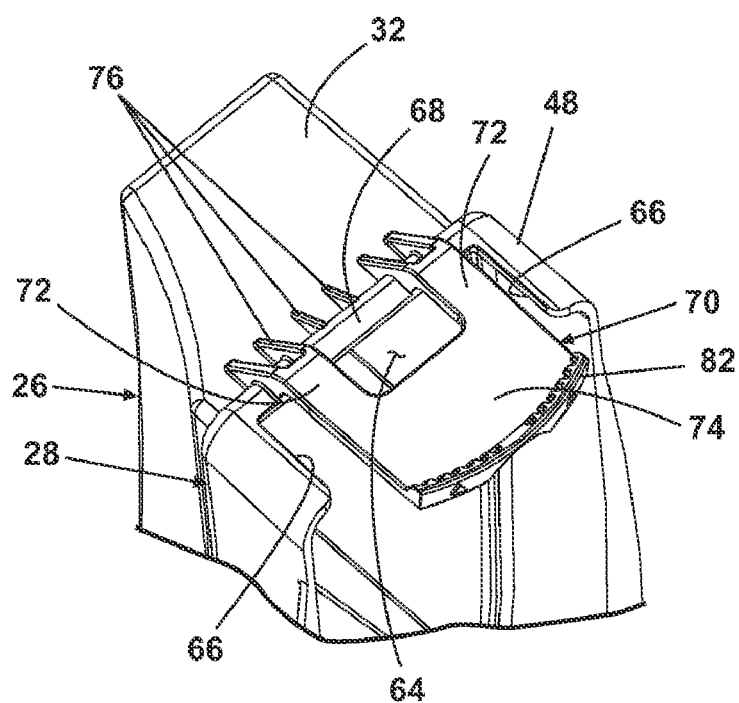

Referring to FIGS. 6A-6B, the top wall 48 has a cut-out 64 defined by two side portions 66 and a rear portion 68 of the top wall 48. A resilient tab 70 extends forwardly from the rear portion 68 and comprises a pair of arms 72 that are joined to a tab body 74. The tab 70 can flex about the rear portion 68 in a vertical direction. Strengthening ribs 76 can be formed with the arms 72 and top walls 32, 48 of the first and second housing portions 26, 28 to allow for repeated flexing of the tab 70. The tab body 74 further comprises a ridge 82 extending substantially across the forward edge of its top surface. The bottom surface of the tab body 74 has an indentation 84 formed adjacent the forward edge of the tab 70 and a catch 86 that extends normally from the bottom surface.

Referring to FIGS. 7-9, the filter carrier 20 is generally rectilinear in shape and supports a filter element 88 for removing airborne particulates, such as dirt, dust, mold, bacteria, or pollen. The filter element 88 can be pleated and made of a particulate filter material, such as a high efficiency particulate air (HEPA) filter. The pleats can be continuous across the width of the filter element 88. Alternately, the filter element 88 can comprise at least one rib 89 to make the pleats shorter and less likely to break or tear.

The filter carrier 20 comprises spaced top and bottom walls 90, 92 joined by spaced right and left side walls 94, 96, and a front wall 98. The filter carrier 20 further comprises a flange 100 that is integrally formed with the rear edges of the top, bottom, right side, and left side walls 90-96. The flange 100 borders an open rear face of the filter carrier 20 that forms an air inlet 102 to the filter element 88. The top, bottom, right side and left side walls 90-96 are preferably impermeable to air, while the front wall 98 is substantially open to form an air outlet 104 from the filter element 88. Vertical and horizontal ribs 101, 103, respectively, cross the air outlet 104 to strengthen the filter carrier 20 and help support the filter element 88.

A resilient gasket 106 is provided on the rear surface of the flange 100 to provide an airtight seal between the filter carrier 20 and the filter receiver 18, when the filter carrier 20 is mounted thereon. While the resilient gasket 106 is preferably affixed to the filter carrier 20, optionally, the resilient gasket 106 could be affixed to a portion of the filter receiver 18, such as the stepped wall 56.

Figure 10:
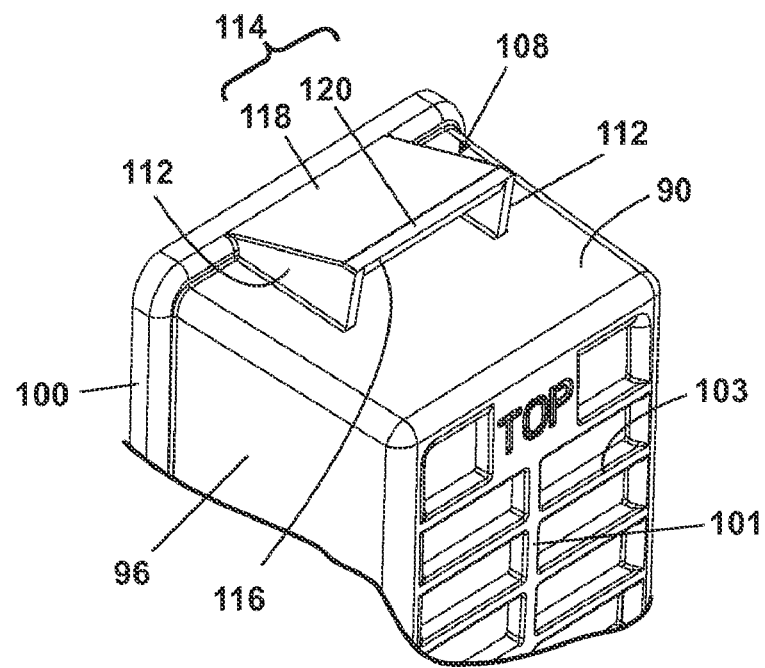
FIG. 10 is a partial top perspective view of the filter carrier from FIG. 7, illustrating a first protrusion on the filter carrier.

Protrusions 108, 110 are formed on the top and bottom wall 90, 92, respectively. The first and second protrusions 108, 110 cooperate, respectively, with the slot 58 and tab 70 to retain the filter carrier 20 on the filter receiver 18. Referring to FIG. 10, the first protrusion 108 comprises a pair of spaced side walls 112 extending normally away from the top wall 90 that are joined by a top wall 114, and a front planar surface 116 extending generally normally away from the top wall 90 and oriented generally perpendicular to the flange 100 extending along the top wall 90. The top wall 114 includes a first and second surface 118, 120, where the first surface 118 extends from the flange 100 to the second surface 120 and is acutely angled with the respect the top wall 90 of the filter carrier 20 and the second surface 120 extends from the first surface 118 to the front planar surface 116 and is generally parallel to the top wall 90. The front planar surface 116 is spaced from the flange 100 and can be formed by the edges of the side and top walls 112, 114. While the first protrusion 108 is illustrated as being substantially hollow, it may alternately be substantially solid.

Figure 11:
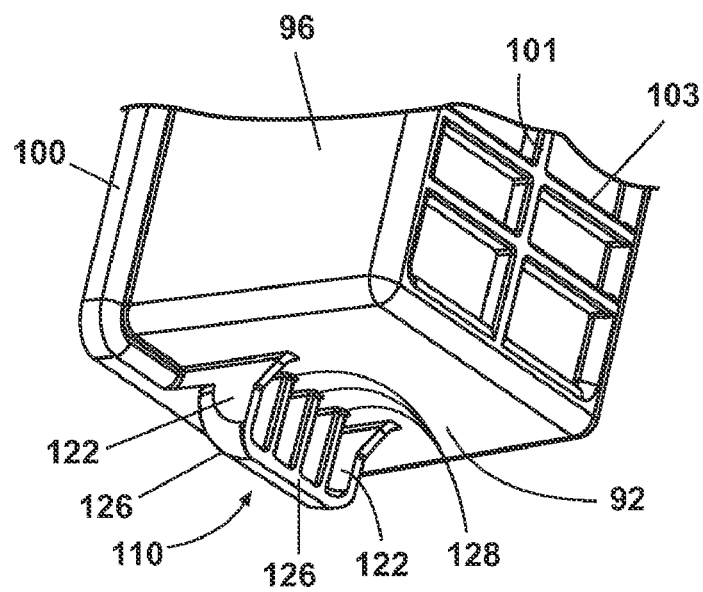
FIG. 11 is a partial bottom perspective view of the filter carrier from FIG. 7, illustrating a second protrusion on the filter carrier.

Referring to FIG. 11, the second protrusion 110 comprises a pair of spaced side walls 122 extending normally away from the bottom wall 92 that are joined by an arcuate wall 124 extending from the flange 100 to a front engagement surface 126. Multiple ribs 128 extend between the bottom wall 92 and the arcuate wall 124, and define at least a portion of the front engagement surface 126. Alternately, the ribs 128 can be eliminated for a substantially hollow second protrusion 110, or the second protrusion can be substantially solid.

Figure 12:
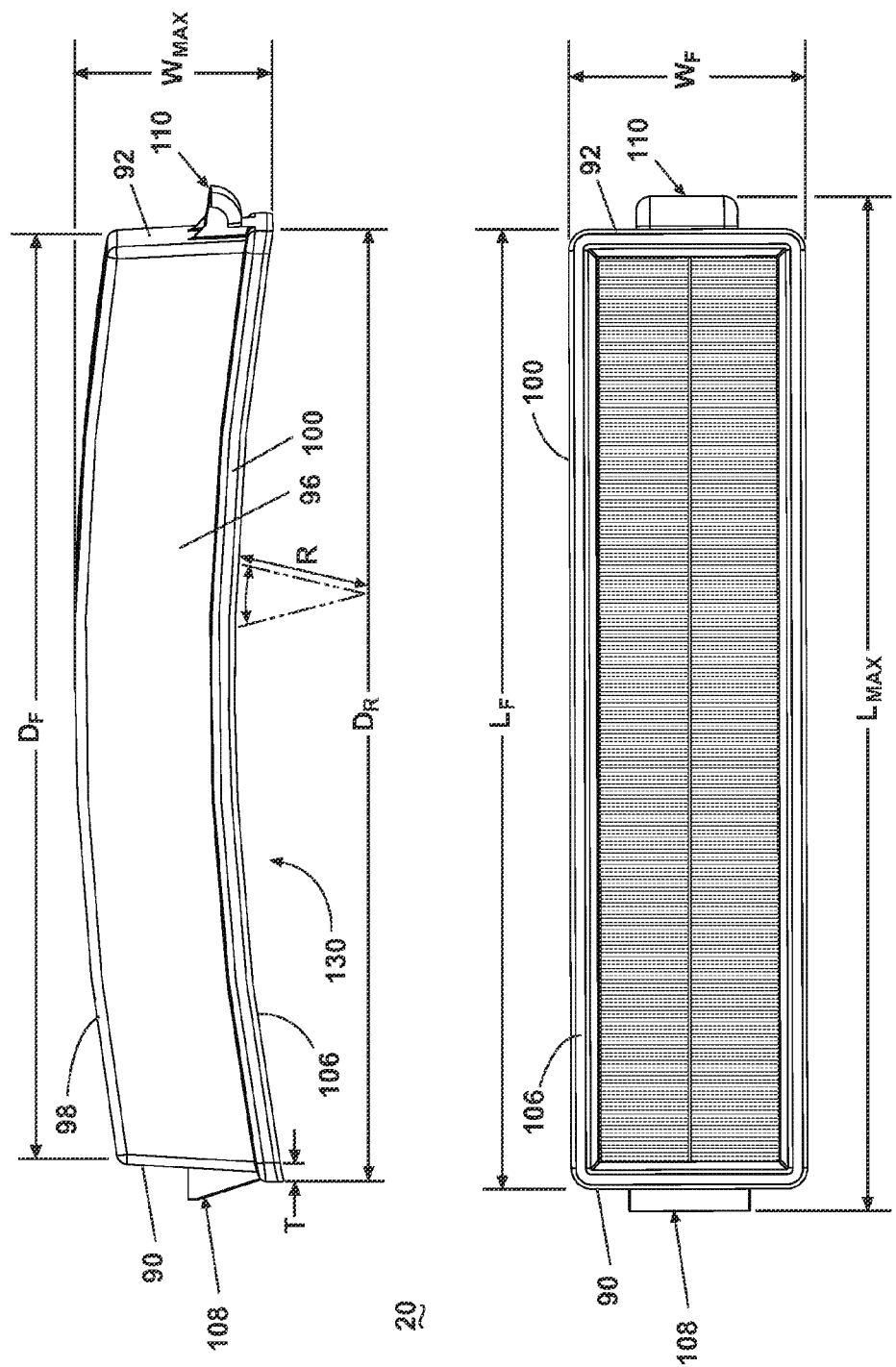
FIG. 12 is a schematic illustration showing various dimensions of the filter carrier.

Referring to FIG. 12, the rear face of the filter carrier 20 is bowed to give it an arcuate or concave rear surface 130. Preferably, the front wall 98 is also bowed to give the filter carrier 20 an overall curved profile. The top and bottom walls 90, 92 are non-parallel and diverge along different planes in a direction towards the rear surface 130. The flange 100 is also bowed to follow the arc of the rear surface 130. Generally, the bow or arc of the rear surface 130 is defined by a radius of curvature R. Preferably, the radius of curvature R of the rear surface 130 is between 700 and 870 mm.

By way of example, a filter carrier 20 according to the present invention can have one or more of the following dimensions: a linear distance $L_F$ between the outer surfaces of the flange along the top and bottom walls of 284.5 mm; a linear distance $W_F$ between the outer surface of the flange along the side walls of 70 mm; a thickness T of the flange and or resilient seal of 5 mm; a linear distance $D_F$ between the top and bottom walls along the front surface 100 of 274.4 mm; a linear distance $D_R$ between the inner surfaces of the flange along the rear surface 98 of 273 mm; a maximum length $L_{MAX}$ between the outermost surfaces of the protrusions of 300.7 mm; a maximum profile width $W_{MAX}$ between the rear surface of the filter carrier 20 along the top or bottom wall and the farthest point on the front surface 100 of 58.7 mm; and a radius of curvature R of the rear surface 130 of about 786 mm.

Figure 13:
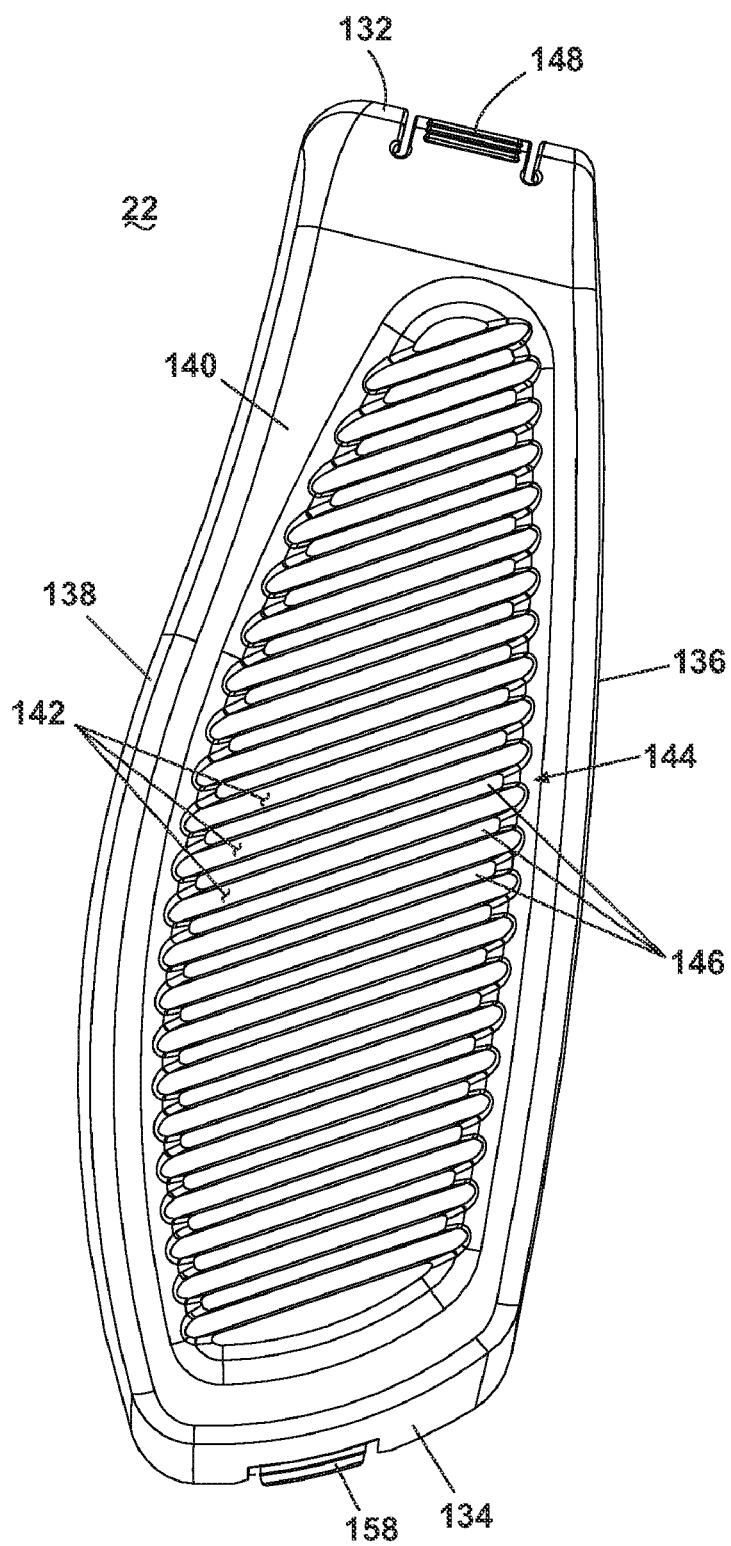
FIG. 13 is a front view of the filter cover from FIG. 2.

Referring to FIG. 13, the filter cover 22 comprises spaced top and bottom walls 132, 134 joined by spaced right and left side walls 136, 138 and a front wall 140. The top, bottom, right side, and left side walls 132-138 are preferably contoured to complement the shape of the recess 24. The filter cover 22 further comprises at least one exhaust opening 142 therethrough to allow air which has passed through the filter element 88 to be exhausted from the vacuum cleaner 10. Preferably, the filter cover 22 comprises multiple exhaust openings 142 forming a grill 144 on the front wall 140. As illustrated, the grill 144 comprises a plurality of elongated slats 146 defining the exhaust openings 142 therebetween.

Figure 14:
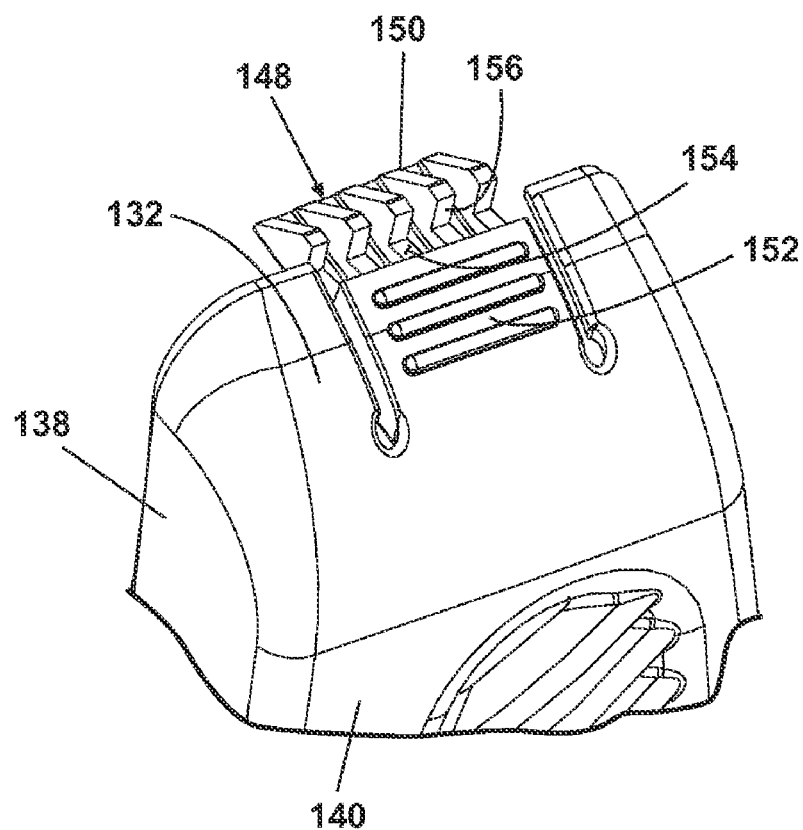
FIG. 14 is a partial top perspective view of the filter cover from FIG. 13, illustrating a resilient tab on the filter cover.

Referring to FIG. 14, a resilient tab 148 is integrally formed in the top wall 132 and comprises a latch portion 150 and a user-engagable portion comprising a release button 152. The latch portion 150 has a recess 154 and an engagement surface 156 formed at a rear side of the recess 154. The latch portion 150 is adapted to seat behind a portion of the recess 24 and retain the upper portion of the filter cover 22 on the vacuum cleaner 10. The release button 152 is adapted to receive pressure from a user to release the latch portion 150 from the recess 24 by flexing the tab 148 downwardly, thereby freeing the filter cover 22 for removal from the vacuum cleaner 10.

Figure 15:
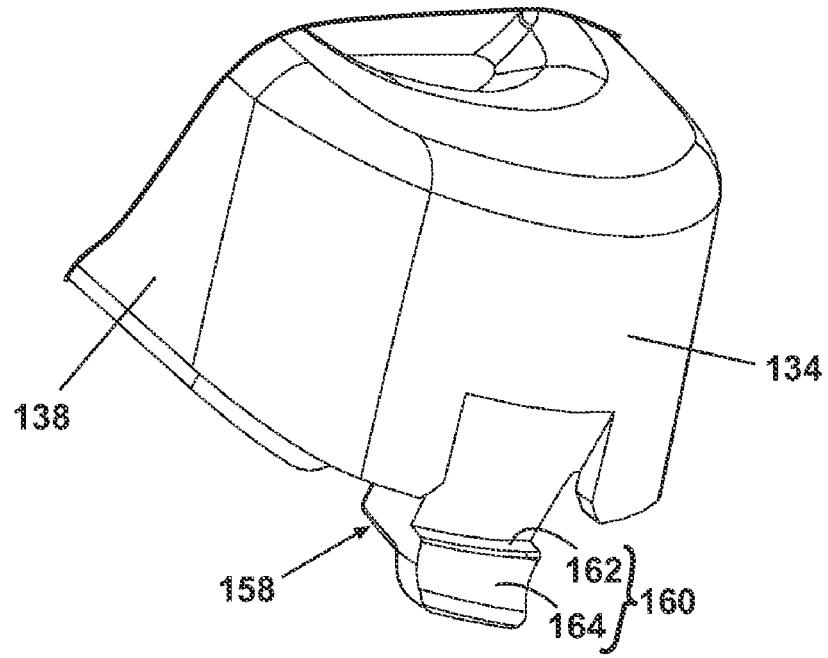
FIG. 15 is a partial bottom perspective view of the filter cover from FIG. 13, illustrating a catch on the filter cover.
Figure 16:
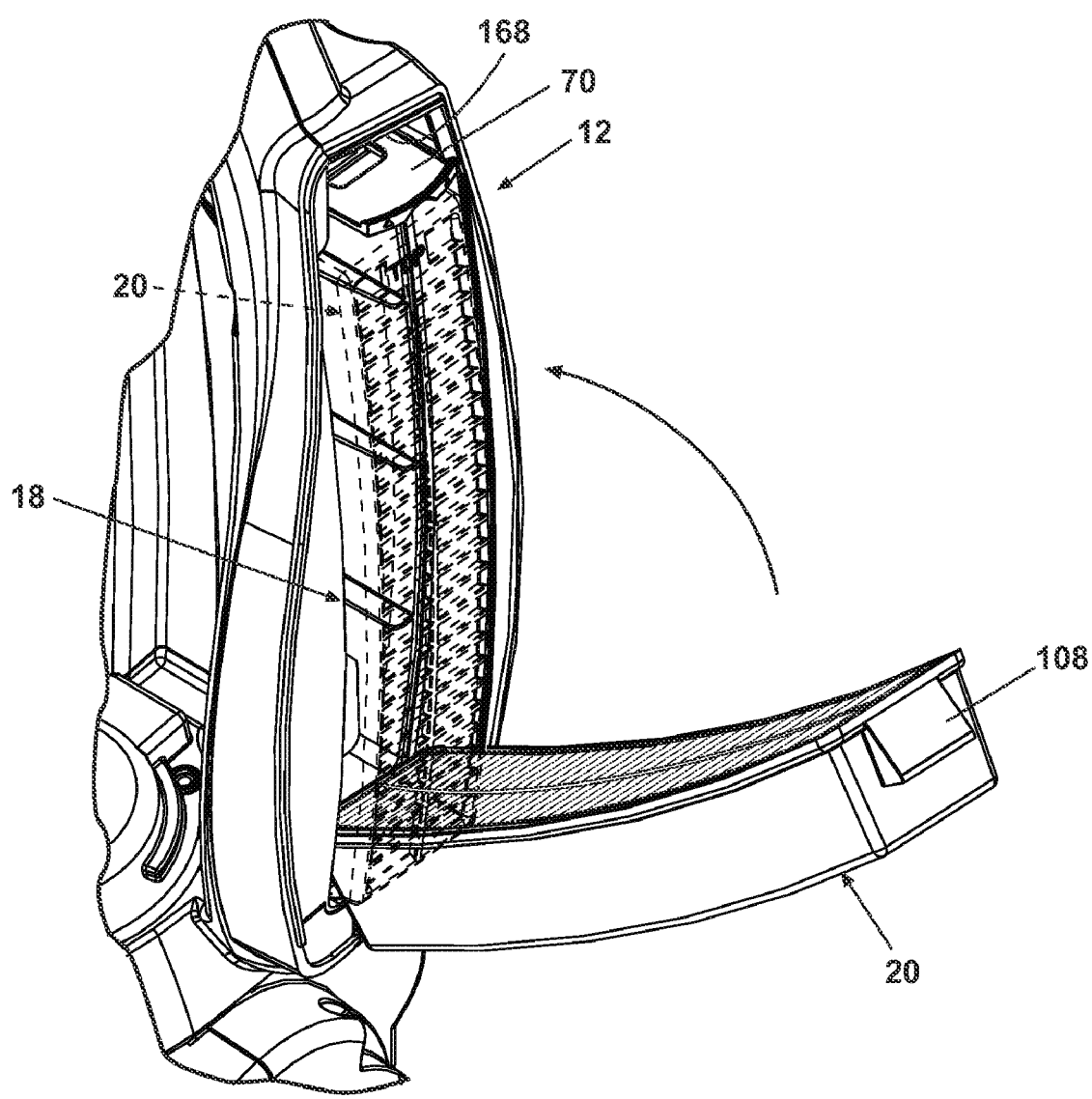
FIG. 16 is a perspective view of the filter assembly, illustrating the mounting of the filter carrier to the filter receiver.
Figure 17:
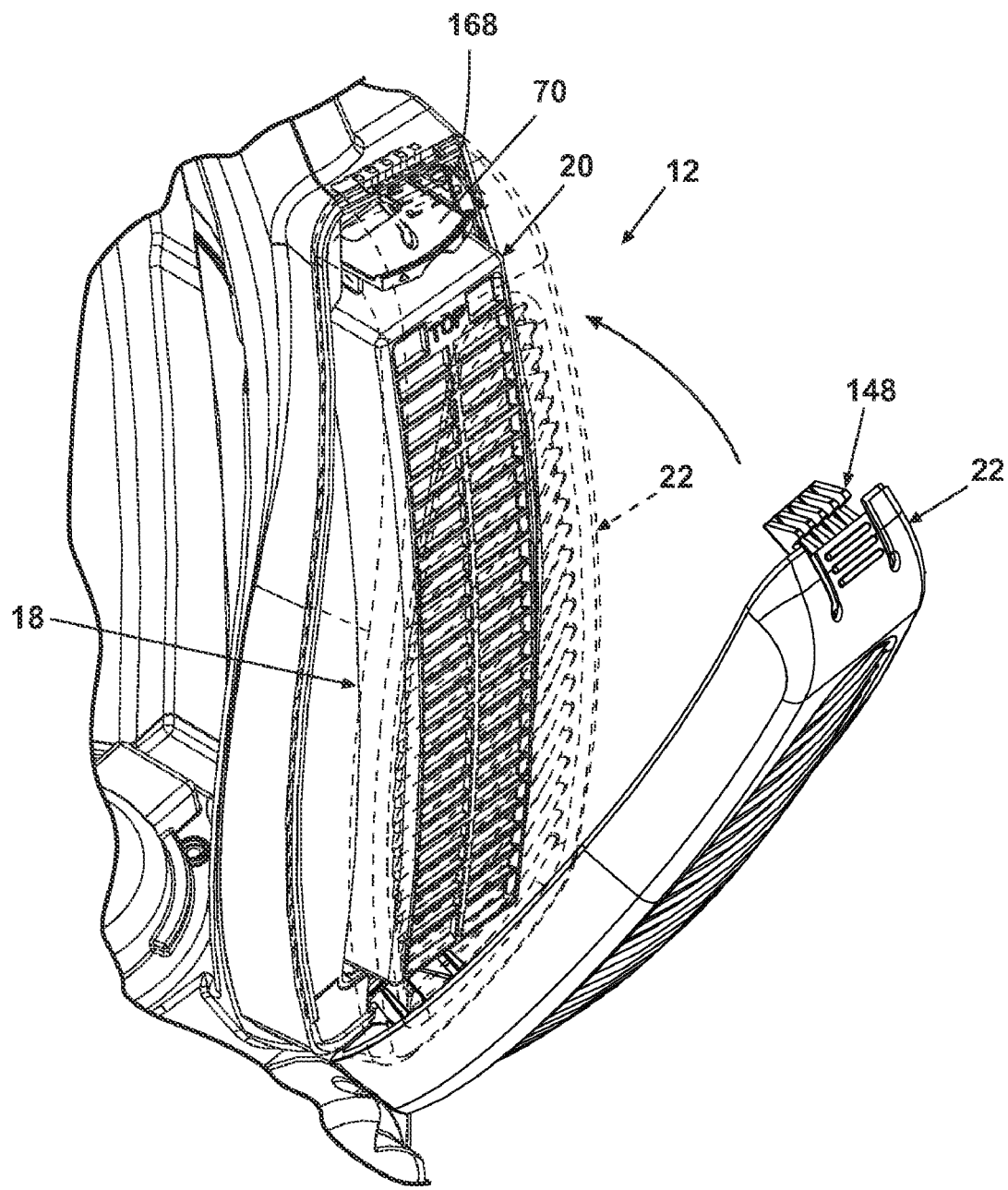
FIG. 17 is a perspective view of the filter assembly, illustrating the mounting of the filter cover to the vacuum cleaner.
Figure 18:
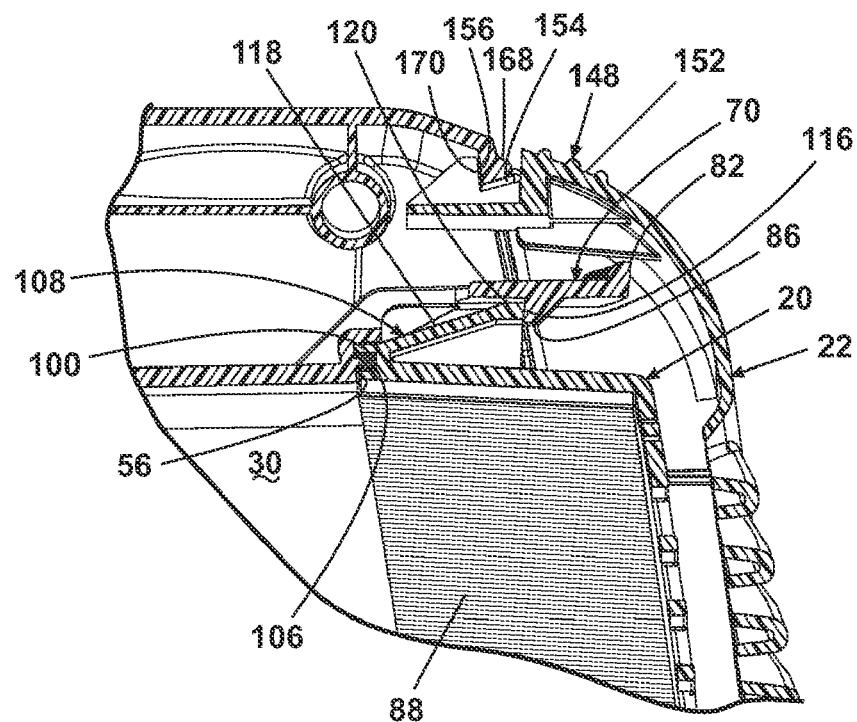
FIG. 18 is a partial cross-sectional view taken through line 18-18 of FIG. 1, illustrating the upper portion of the filter assembly.
Figure 19:
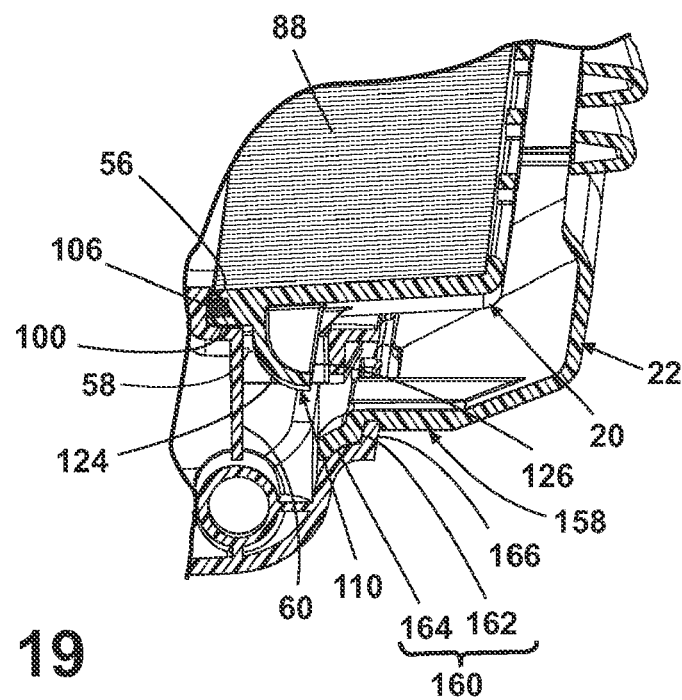
FIG. 19 is a partial cross-sectional view taken through line 18-18 of FIG. 1, illustrating the lower portion of the filter assembly.

Referring to FIG. 15, a generally rigid catch 158 is integrally formed in the bottom wall 134 and comprises an engagement surface 160 adapted to fit within a portion of the recess 24 and retain the lower potion of the cover 22 on the vacuum cleaner 10. The engagement surface 160 can comprise a first, generally vertical portion 162 and a second, generally curved portion 164.

Both the filter element 88 and the filter carrier 20 are preferably disposable so that when the filter element 88 becomes clogged with particulates, the filter carrier 20 can be removed along with the filter element 88 and disposed of, and a new filter carrier 20 with filter element can be installed in its place. In the course of replacing the filter element 88, both the filter cover 22 and filter carrier 20 are removed from the vacuum cleaner 10.

Referring to FIGS. 16-19, the assembly of the filter assembly is illustrated. Typically, the filter receiver 18 is mounted in the recess 24 of the vacuum cleaner 10 at the point of manufacture and is not done by a home user; thus, this portion of the assembly is not illustrated herein. To mount the filter carrier 20 to the filter receiver 18, the second protrusion 110 of the filter carrier 20 is inserted into the slot 58 of the filter receiver 18. The arcuate wall 124 is important for the pivoting of the second protrusion 110 and the filter carrier 20 about an axis while the engagement surface 126 abuts a front edge of the slot 58. The filter carrier 20 is rotated as indicated by the arrows in FIG. 15 to bring the first protrusion 108 into engagement with the resilient tab 70. Specifically, the catch 86 on the tab 70 seats behind the front planar surface 116 of the first protrusion. The filter carrier 20 is generally received within the second housing portion 28 of the filter receiver 18, with the gasket 106 pressed against the stepped wall 56 to create a substantial airtight seal between the flange 100 and the filter receiver, forcing air from the airflow chamber 30 to pass through the filter element 88.

To attach the filter cover 22, the catch 158 is inserted into a correspondingly shaped lower retainer 166 formed at a bottom edge of the recess 24 (FIG. 2). The curved portion 164 allows easy pivoting of the filter cover 22 to bring the tab 148 into engagement with an upper retainer 168 formed at an upper edge of the recess 24. The upper retainer 168 is received within the recess 154, with an inner surface 170 of the upper retainer 168 in abutting relationship with the engagement surface 156.

While the invention has been specifically described in connection with certain specific embodiments thereof, it is to be understood that this is by way of illustration and not of limitation. For example, while the vacuum cleaner shown herein is illustrated as comprising a cyclone separator, it is understood a vacuum cleaner employing a bag filter or another bagless-type of separation assembly can employ the filter assembly described herein. Moreover, the filter assembly can also be used in conjunction with a vacuum cleaner employing a separate pre-motor filter assembly. Conversely, the filter assembly can, with minimal modifications, function as a pre-motor filter assembly itself. Reasonable variation and modification are possible with the scope of the foregoing disclosure and drawings without departing from the spirit of the invention which is defined in the appended claims.

What is claimed is:

1. A filter assembly for a vacuum cleaner, comprising:
   a filter carrier comprising:
      a pair of opposed side walls, each having an arced rear edge;
      a pair of opposed end walls that are narrower in width than the side walls, each end wall having a rear edge and a protrusion extending away from the end wall;
      the rear edges of the side and end walls defining a concave air inlet opening; and
      a front side having an air outlet; and
   a filter element associated with the filter carrier;
   wherein one of the protrusions comprises a planar surface oriented generally perpendicular to the end wall and generally parallel to and spaced from the rear edge, a ramped surface formed between the rear edge and the planar surface and increasing in height in a direction away from the air inlet, and a pair of opposed, parallel side walls extending orthogonally from the end wall to the planar surface and the ramped surface.

2. The filter assembly of claim 1 wherein the other of the protrusions comprises a second planar surface oriented generally perpendicular to the end wall and generally parallel to and spaced from the rear edge, and an arced surface extending from the top of the second planar surface towards the rear edge.

3. A filter assembly for a vacuum cleaner, comprising:
a filter carrier comprising:
   a pair of opposed side walls, each having an arced rear edge;
   a pair of opposed end walls that are narrower in width than the side walls, each end wall having a rear edge and an obverse surface;
   a first protrusion projecting from at least one obverse surface;
   the rear edges of the side and end walls defining a concave air inlet opening; and
   a front side having an air outlet; and
a filter element adapted to be mounted within the filter carrier;
wherein the first protrusion comprises a planar surface oriented generally perpendicular to the end wall and generally parallel to the rear edge, the planar surface defining a ramp that extends from the planar surface towards the rear edge, and a pair of opposed, parallel side walls extending orthogonally from the end wall to the planar surface and the ramped surface.

4. The filter assembly of claim 3 wherein a second protrusion extends away from the end wall opposite the at least one end wall.

5. The filter assembly of claim 4 wherein the second protrusion comprises a planar surface oriented generally perpendicular to the end wall and generally parallel to the rear edge and forms an arc from the top of the planar surface towards the rear edge.

6. The filter assembly of claim 3 wherein a resilient gasket is affixed to the rear edges of the side and end walls to form a seal between the filter carrier and the filter receiver.

7. The filter assembly of claim 3 wherein both the side walls and end walls are impermeable to air.

8. The filter assembly of claim 3 wherein the filter element comprises a pleated filter.

9. The filter assembly of claim 8 wherein the filter element has a reinforcing rib along the length thereof and between the sides thereof.

10. The filter assembly of claim 9 wherein the filter element is sealed within the filter carrier.

11. The filter assembly of claim 10 wherein the filter element comprises a HEPA filter.

12. The filter assembly of claim 3 wherein the radius of curvature of the arced rear edge of each side wall is in the range of about 700 mm to about 870 mm.

13. The filter assembly of claim 3 wherein the radius of curvature of the arced rear edge of each side wall is about 786 mm.

14. The filter assembly of claim 3 wherein the filter element is sealed within the filter carrier.

15. The filter assembly of claim 3 and further comprising a reinforcing rib along the length of the filter element and between the sides thereof.

16. The filter assembly of claim 3 wherein the ramp formed by the first protrusion increases in height in a direction away from the air inlet.

17. The filter assembly of claim 16 wherein a second protrusion extends away from the end wall opposite the at least one end wall and the second protrusion comprises a second planar surface oriented generally perpendicular to the end wall and generally parallel to and spaced from the rear edge, and an arced surface extending from the top of the second planar surface towards the rear edge.

* * * * *